United States Patent
Vogt et al.

(10) Patent No.: US 11,639,180 B1
(45) Date of Patent: May 2, 2023

(54) NOTIFICATIONS FROM AN AUTONOMOUS VEHICLE TO A DRIVER

(71) Applicant: GM Cruise Holdings LLC, San Francisco, CA (US)

(72) Inventors: Kyle Vogt, San Francisco, CA (US); Oliver Cameron, San Jose, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 92 days.

(21) Appl. No.: 17/364,522

(22) Filed: Jun. 30, 2021

(51) Int. Cl.
 *B60W 50/14* (2020.01)
 *H04W 4/46* (2018.01)
 *B60W 60/00* (2020.01)

(52) U.S. Cl.
 CPC ........ *B60W 50/14* (2013.01); *B60W 60/0015* (2020.02); *B60W 60/00253* (2020.02); *B60W 60/00274* (2020.02); *H04W 4/46* (2018.02); *B60W 2050/143* (2013.01); *B60W 2050/146* (2013.01); *B60W 2556/65* (2020.02)

(58) Field of Classification Search
 CPC ........... B60W 50/14; B60W 60/00253; B60W 60/0015; B60W 60/00274; B60W 2556/65; B60W 2050/143; B60W 2050/146; H04W 4/46
 See application file for complete search history.

(56) References Cited

U.S. PATENT DOCUMENTS

| | | | |
|---|---|---|---|
| 9,832,241 B1 | 11/2017 | Hayward | |
| 10,303,178 B1 * | 5/2019 | Gutmann | ............. B60W 30/09 |
| 10,623,925 B2 * | 4/2020 | Itatsu | ..................... H04W 4/80 |
| 2004/0128062 A1 * | 7/2004 | Ogino | ................ G01C 21/3697 |
| | | | 455/414.1 |
| 2018/0143641 A1 * | 5/2018 | Rao | ................... B60W 60/0023 |
| 2018/0196415 A1 * | 7/2018 | Lagnemma | ........ G01C 21/3438 |
| 2018/0297612 A1 * | 10/2018 | Fukamachi | ............ G06Q 10/02 |
| 2018/0342157 A1 * | 11/2018 | Donnelly | ........... G08G 1/09626 |
| 2019/0051159 A1 * | 2/2019 | Wang | ................... G05D 1/0088 |
| 2019/0088132 A1 * | 3/2019 | Riggins | ................ G05D 1/0278 |
| 2019/0250002 A1 * | 8/2019 | Zhao | ..................... B60W 50/14 |
| 2020/0086888 A1 * | 3/2020 | Engle | ................... G05D 1/0214 |
| 2020/0133284 A1 * | 4/2020 | Hur | ....................... G05D 1/0291 |
| 2020/0239023 A1 * | 7/2020 | Srinivasan | ........... G05D 1/0276 |
| 2020/0247434 A1 | 8/2020 | Kim et al. | |
| 2021/0034889 A1 * | 2/2021 | Subramanian | ........... G06T 7/20 |
| 2021/0086757 A1 * | 3/2021 | Sugano | ............ G08G 1/096816 |
| 2021/0101617 A1 * | 4/2021 | Nakadai | ................. G08G 1/162 |
| 2021/0157332 A1 * | 5/2021 | Cox | ..................... G08G 1/0112 |
| 2021/0163021 A1 * | 6/2021 | Frazzoli | .................. H04W 4/00 |
| 2021/0245775 A1 * | 8/2021 | Subramanian | ....... G06V 20/597 |
| 2021/0309258 A1 * | 10/2021 | Okazaki | ................ B60W 50/12 |
| 2021/0323573 A1 * | 10/2021 | Gogna | ................. B60W 50/14 |

(Continued)

*Primary Examiner* — Chico A Foxx

(74) *Attorney, Agent, or Firm* — Akona IP

(57) ABSTRACT

An autonomous vehicle (AV) implements a notification system that provides notifications to user devices in nearby vehicles to alert drivers of the nearby vehicles of the AV's planned behavior. The notifications are delivered wirelessly and output by the user device to the drivers. The planned behaviors of the AV may not be conveyed by existing mechanisms, such as turning signals or hazard lights. The AV or the receiving user device may determine when an AV's planned behavior may impact a particular driver, and provide relevant notifications to the driver.

20 Claims, 5 Drawing Sheets

(56) References Cited

U.S. PATENT DOCUMENTS

2022/0080879 A1* 3/2022 Moon .................... B60Q 1/508
2022/0097734 A1* 3/2022 Limaye ................. G08G 1/123
2022/0194409 A1* 6/2022 Koga ................. B60W 40/105
2022/0227391 A1* 7/2022 Wang .................... B60W 40/06

* cited by examiner

NOTIFICATIONS FROM AN AUTONOMOUS VEHICLE TO A DRIVER

TECHNICAL FIELD OF THE DISCLOSURE

The present disclosure relates generally to autonomous driving and, more specifically, to devices and methods for providing notifications regarding planned behavior of an autonomous vehicle to a driver of a nearby non-autonomous vehicle.

BACKGROUND

Drivers of non-autonomous vehicles use a variety of signals to communicate with each other on the road. For example, drivers use turn signals to indicate to other vehicles that their vehicles are turning or pulling over. Drivers use hazard signals to indicate that they are driving slowly or stopping in an unusual position (e.g., double parking). Autonomous vehicles (AVs) do not have drivers, but they can use typical built-in vehicle communication mechanisms, such as various external lights and horns, to signal their intents and behaviors to other drivers. However, some interactions between drivers cannot be easily conveyed using vehicles' built-in communication mechanisms. For example, in certain situations, human drivers may use hand signals, such as waving or pointing, or verbal communication, to express themselves to other drivers. For example, if two vehicles reach an intersection at the same time, one driver may wave on the other driver to offer the right-of-way. Without a human driver, AVs cannot participate in these sorts of communications. This can impede the flow of traffic for all vehicles, and it may frustrate human drivers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
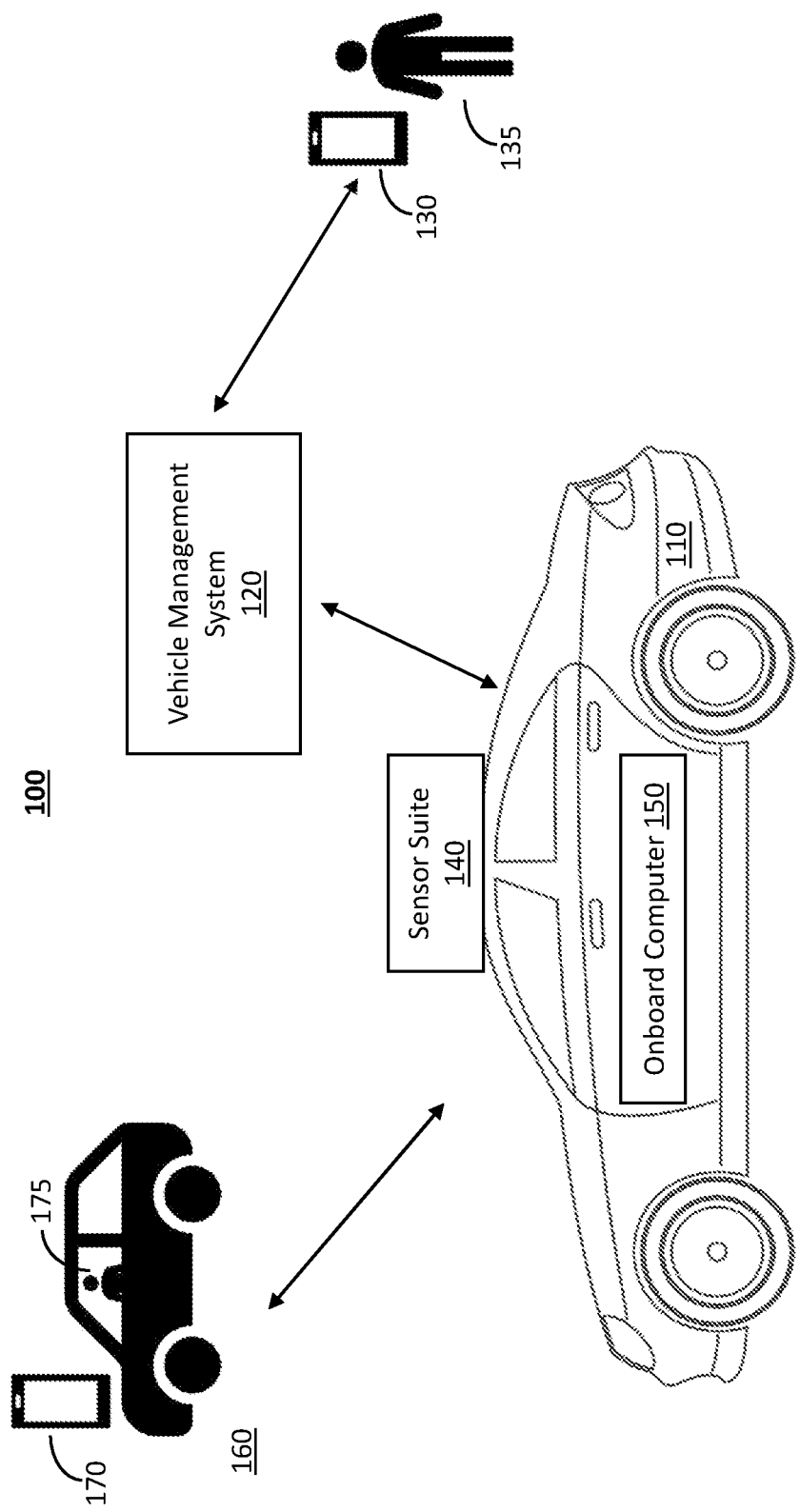
FIG. 1 is a block diagram illustrating a system including an example AV equipped to provide notifications about planned AV behavior according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

AVs typically include traditional built-in vehicle communication mechanisms, such external lights that can be used as turn signals and hazard lights, and horns. However, in certain situations, these systems do not adequately convey a driver's or a vehicle's intent. In non-autonomous vehicles, drivers can resort to other communication mechanisms, such as hand signals or calling out to each other verbally. Such alternate communication mechanisms are not available to AVs because they do not have a human driver.

As described herein, an AV includes a notification system that provides notifications regarding the AV's planned behavior to one or more other vehicles. The AV transmits the notifications via a wireless communications interface to devices located in other vehicles, such as drivers' mobile devices or in-vehicle user interface systems. The devices receive the notifications and output the notifications to the drivers, informing the drivers of the AV's planned behaviors. These notifications enable AVs to better inform other drivers of their planned behaviors in non-standard situations, when typical built-in vehicle communications mechanisms do not suffice.

As an example, in certain vehicle interactions, it can be ambiguous which vehicle has the right-of-way, e.g., if two vehicles reach an intersection at the same time, and their planned pathways cross in the intersection. In this situation, one driver may take the right-of-way. Alternatively, a driver may use a hand gesture to offer the right-of-way to another vehicle. When a driver encounters this situation with an AV, the driver may be uncertain whether to take the right-of-way or wait for the AV. At the same time, the AV may be waiting for the driver to take the right-of-way. This type of interaction can halt the flow of traffic, and it may frustrate or confuse the driver. The AV can use the notification system to offer the right-of-way to the other driver, allowing traffic flow to continue.

The notification system may be particularly useful in AVs that provide services to requesting users, as these AVs often exhibit behavior that is not typical in most non-autonomous vehicles. For example, an AV that provides a ridesharing service picks up a passenger at a particular location, and the AV may wait several minutes for the passenger to find and enter the AV. As another example, an AV that provides a delivery service drives to a delivery location, and the AV may wait several minutes for the user to find the AV, access the AV, and retrieve their items for delivery. Depending on the roadways, traffic, parking availability, and other factors near the delivery location, the AV may reduce or block the flow of traffic while performing a delivery or pickup. Alternatively, the AV may idle in a parking spot for a period of time, which may confuse drivers searching for a parking spot. By contrast, in a delivery service provided by a human driver, the driver typically parks in a legal parking spot, turns off the vehicle, and exits the vehicle to perform the delivery.

If the AV (or a human driver) blocks the flow of traffic for a period of time, or idles in a parking spot without indicating whether they are exiting the parking spot, this can be very frustrating to other drivers. Providing a notification of the AV's intentions improves the experience of other drivers in the environment of the AV. In some embodiments, the AV can provide a time estimate that the AV is waiting, e.g., based on a real-time mobile device location of a passenger or delivery recipient. If the AV notifies a driver that the AV expects to idle at a particular location for less than one minute, the driver may wait for the AV to proceed; on the other hand, if the AV notifies a driver that the AV expects to idle at a particular location for five minutes, the driver may choose another route.

Embodiments of the present disclosure provide a method for providing AV status information to another vehicle. The method includes identifying a vehicle in a current environment of the AV; determining a predicted pathway for the identified vehicle; determining a planned behavior of an AV within the current environment of the AV, the planned behavior effecting the predicted pathway of the identified vehicle; generating a notification for the identified vehicle, the notification including data describing the planned behavior of the AV; and transmitting, by a wireless communication interface, the notification to a device in the identified vehicle.

Additional embodiments of the present disclosure provide a method for providing status information of an AV. The method includes receiving, at a device in a non-autonomous vehicle from an AV, a notification describing a planned behavior of the AV, the notification including a location of the AV, and the notification transmitted to at least one device in a current environment of the AV via a wireless communication interface; determining, based on data in the notification and at least one rule for outputting planned behaviors, whether to output the planned behavior to a user of the device; and in response to determining to output the planned behavior, outputting a notification to the user of the device describing the planned behavior of the AV.

Further embodiments of the present disclosure provide a system for providing AV notifications. The system includes a path planning system to determine a planned behavior of the AV; an object prediction engine to generate a predicted pathway of a vehicle in a current environment of the AV, the planned behavior of the AV effecting the predicted pathway of the vehicle; a notification system configured to generate a notification for the vehicle, the notification including data describing the planned behavior of the AV; and a wireless communication interface to transmit the notification to a device in the vehicle.

As will be appreciated by one skilled in the art, aspects of the present disclosure, in particular aspects of providing notifications regarding planned AV behaviors to nearby drivers, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Configured to Provide Notifications about Planned Behavior

FIG. 1 is a block diagram illustrating a system 100 including an example AV 110 equipped to provide notifications about planned AV behavior according to some embodiments of the present disclosure. The system 100 includes an AV 110, a fleet management system 120, a user device 130 of an AV user 135, and a user device 170 of a driver 175. The AV 110 includes a sensor suite 140 and an onboard computer 150. The system 100 enables the AV 110 to provide a notification regarding its planned behavior to the driver 175 via the user device 170. The driver 175 is operating a non-autonomous vehicle 160, also referred to as a vehicle 160, in the environment of the AV 110. For example, the vehicle 160 may be within 50, 100, or 200 meters of the AV 110; within a line-of-sight of the AV 110; within a one-block or several-block radius of the AV 110; or some other local environment of the AV 110. The size or radius of the environment of the AV 110 may be based on the range of wireless communication method by which the AV 110 transmits notifications to the user device 170.

The AV 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV 110 may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions; e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include interior and exterior cameras, radar sensors, sonar sensors, lidar (light detection and ranging) sensors, thermal sensors, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110.

An onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

The onboard computer 150 includes a notification system that transmits notifications to other devices, e.g., to the user device 170 of the driver 175. The notifications may describe the planned behavior of the AV 110. The onboard computer 150 is described further in relation to FIG. 2, and the notification system is described in more detail with respect to FIG. 3.

The fleet management system 120 manages a fleet of AVs, including the AV 110. The fleet management system 120 may manage one or more services that provides or uses the AVs, e.g., a service for providing rides to users using the AVs, or a service for providing deliveries to user using the AVs. The fleet management system 120 also manages fleet maintenance tasks, such as fueling, inspecting, and servicing of the AVs. The AV 110 and the fleet management system 120 may connect over a public network, such as the Internet.

The user device 130 is a personal device of the AV user 135, e.g., a smartphone, tablet, computer, or other device for interfacing with a user of the fleet management system 120. The user device 130 and the fleet management system 120 may connect over a public network, such as the Internet. The user device 130 may provide one or more applications (e.g., mobile device apps or browser-based apps) with which the AV user 135 can interface with a service that provides or uses AVs, such as a service that provides rides to users in AVs, or a service that provides deliveries to users using the AVs. The service, and particularly the AVs associated with the service, is managed by the fleet management system 120, which may also provide the application to the user device 130.

The user device 170 may be personal device of the driver 175, e.g., a smartphone, tablet, computer, or other device. The user device 170 may be mounted in the vehicle 160, e.g., as a display screen or touchscreen mounted in the dashboard, or a tablet mounted in the vehicle 160. In some embodiments, the user device 170 is connected to an in-vehicle entertainment system of the vehicle 160. In some embodiments, the user device 170 is integrated into the vehicle 160, e.g., the user device 170 is an element of the built-in in-vehicle entertainment system of the vehicle 160. The user device 170 may include or connect to one or more displays, speakers, or other output devices for the driver 175 to receive notifications from the AV 110. In some embodiments, the interfaces provided by the user device 170 provide additional features, such as a navigation feature, in-vehicle temperature settings, music selections, etc. The user device 170 is configured to generate displays or other outputs showing or describing the planned behavior of the AV 110 to the driver 175.

Example Onboard Computer

Figure 2:
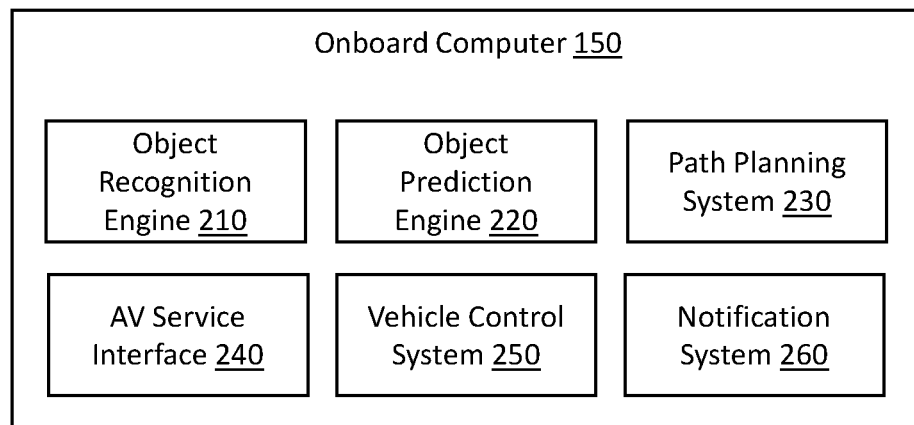
FIG. 2 is a block diagram illustrating an onboard computer according to some embodiments of the present disclosure.

FIG. 2 is a block diagram illustrating the onboard computer 150 according to some embodiments of the present disclosure. The onboard computer 150 includes an object recognition engine 210, an object prediction engine 220, a path planning system 230, an AV service interface 240, a vehicle control system 250, and a notification system 260. In alternative configurations, fewer, different and/or additional components may be included in the onboard computer 150. Further, functionality attributed to one component of the onboard computer 150 may be accomplished by a different component included in the onboard computer 150 or a different system than those illustrated.

The object recognition engine 210 identifies objects in the environment of the AV 110. The sensor suite 140 produces a data set that is processed by the object recognition engine 210 to detect other vehicles, pedestrians, bicycles, and other objects within a road on which the AV 110 is traveling (such as construction and/or other objects that may impede movement of the vehicle), and indications surrounding the AV 110 (such as construction signs, traffic lights, stop indicators, and other street signs). For example, the data set from the sensor suite 140 may include images obtained by cameras, point clouds obtained by lidar (light detecting and ranging) sensors, and data collected by radar sensors. The object recognition engine 210 may include one or more classifiers trained using machine learning to identify particular objects. For example, a multi-class classifier may be used to determine whether each object in the environment of the AV 110 is one of a set of potential objects, e.g., a vehicle, a pedestrian, or a bicyclist. As another example, a pedestrian classifier recognizes pedestrians in the environment of the AV 110, a vehicle classifier recognizes vehicles in the environment of the AV 110, etc.

The object prediction engine 220 predicts future pathways for certain types of objects identified by the object recognition engine 210. In particular, the object prediction engine 220 predicts one or more predicted pathways for objects that are moving or are able to move, e.g., other vehicles, pedestrians, bicycles, animals, etc. For example, for a vehicle approaching an intersection, the object prediction engine 220 predicts a pathway for the vehicle based on the lane in which the vehicle is traveling (e.g., a left turn lane), any vehicle turn indicators (e.g., the left turn indicator), the speed of the vehicle (e.g., whether the vehicle is slowing down to make a turn), right-of-way rules or conventions, or other factors.

The path planning system 230 plans a path for the AV 110 based on data received from the object recognition engine 210 and the object prediction engine 220. In some embodiments, the path planning system 230 also receives navigation information, e.g., a description of a planned route, or the address of a destination. The path planning system 230 may receive additional data, e.g., additional signals from the sensor suite 140, data provided by the AV user 135 via the user device 130, and data from the fleet management system 120. The path planning system 230 determines a planned pathway for the AV 110 to follow by applying path planning rules or models to the received data. When objects are present in the environment of the AV 110, the path planning system 230 determines the planned pathway for the AV 110 based on predicted pathways of the objects and right-of-way rules that regulate behavior of vehicles, bicycles, pedestrians, or other objects.

In some cases, the planned pathway includes locations for the AV 110 to maneuver to, and timing and/or speed of the AV 110 in maneuvering to the locations. For example, the planned pathway includes a series of points along the roadway and a corresponding set of velocities, where the AV 110 plans to travel at a given velocity when the AV 110 crosses the corresponding point. The planned pathway may further or alternatively include acceleration data, e.g., a planned acceleration or deceleration rate at points along the planned pathway; timing data, e.g., a time that the AV 110 reaches each point along the planned pathway; and direction data, e.g., a direction that the AV 110 is heading at each point along the planned pathway.

In other cases, rather than planning a pathway for travel, the path planning system 230 may plan to stop or idle the AV 110 at a particular location for a period of time, e.g., if the AV 110 is picking up or dropping off a passenger, or if the AV 110 is picking up or dropping off items for delivery. In some situations, the path planning system 230 may plan a path into or out of a parking spot, which may include idling or stopping in the parking spot for a period of time.

The path planning system 230 may determine a planned pathway for a particular time or distance, e.g., the path planning system 230 may plan the next 10 seconds or 20 seconds of maneuvers, or the path planning system 230 may plan the next 10 meters or 30 meters of the planned pathway. The time or distance for which the path planning system 230 determines a planned pathway may depend on context, e.g., for an AV 110 traveling at a higher speed, the path planning system 230 may plan a longer path (e.g., the path planning system 230 plans the next 100 meters if the AV 110 is traveling on a highway) than for an AV 110 traveling at a lower speed (e.g., the path planning system 230 plans the next 10 meters if the AV 110 is traveling on a busy city street). The path planning system 230 continually updates the planned pathway based on the movements of the AV 110 and new data received from the object recognition engine 210, object prediction engine 220, and other sources.

The AV service interface 240 interfaces with the fleet management system 120 and/or user devices of users of a service provided by the AV fleet, such as the user device 130 of the user 135. The AV service interface 240 may receive service assignments from the fleet management system 120, e.g., an instruction to pick up a passenger at a pickup location and drop off the passenger at a destination location, or an instruction to pick up an item or items for delivery from a delivery pickup location (e.g., a restaurant or grocery store) and drop off the items at a delivery destination location (e.g., a user's home). The AV service interface 240 may receive communications from user devices 130, either via the fleet management system 120, another network (e.g., a cellular network), or via a local wireless or wired connection (e.g., if the user device 130 is inside or within a short range of the AV 110). For example, if the AV 110 is completing a passenger pickup or delivery drop-off, the AV service interface 240 receives real-time locations of the user device 130 associated with the user 135 accessing the AV 110. The AV 110 and/or fleet management system 120 may access a user device location for a short time window during an interaction with the AV 110 and as allowed by the user 135; the AV 110 and fleet management system 120 may not be able access the user device location other times, e.g., after the user 135 has entered the AV 110 or after the user 135 been dropped off.

The vehicle control system 250 instructs the movement-related subsystems of the AV 110 to maneuver according to the planned pathway provided by the path planning system 230. The vehicle control system 250 may include the throttle interface for controlling the engine throttle, motor speed (e.g., rotational speed of electric motor), or any other movement-enabling mechanism; the brake interface for controlling the brakes of the AV 110 (or any other movement-retarding mechanism); and the steering interface for controlling steering of the AV 110 (e.g., by changing the angle of wheels of the AV).

The notification system 260 generates notifications regarding planned behavior of the AV 110 for drivers of nearby non-autonomous vehicles, e.g., the driver 175. The notification system 260 receives data from other components of the onboard computer 150, e.g., data from the object recognition engine 210 describing vehicles in the local environment of the AV 110, data from the object prediction engine 220 describing one or more predicted pathways of the vehicles in the local environment, and data from the path planning system 230 describing the planned behavior of the AV 110. The notification system 260 generates a notification for one or more nearby vehicles, e.g., the vehicle 160, and transmits the notifications via a wireless communication interface. In some embodiments, the notification system 260 determines whether a planned behavior of the AV 110 effects a predicted pathway of another vehicle, e.g., the vehicle 160, and generates a notification in response. In other embodiments, the notification system 260 may broadcast planned behaviors of the AV 110, which may or may not affect one or more other vehicles 160. A device, e.g., the user device 170, that receives a notification from the notification system 260 may output the notification to a user. Further details of the notification system 260 are described below with reference to FIG. 3.

Example Notification System

Figure 3:
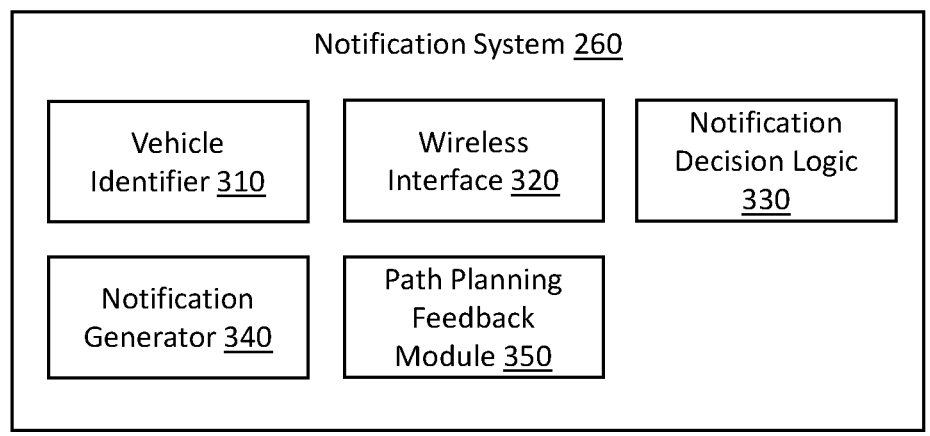
FIG. 3 is a block diagram illustrating a notification system according to some embodiments of the present disclosure.

FIG. 3 is a block diagram illustrating the notification system 260 according to some embodiments of the present disclosure. The notification system 260 includes a vehicle identifier 310, a wireless interface 320, notification decision logic 330, a notification generator 340, and a path planning feedback module 350. In alternative configurations, fewer, different and/or additional components may be included in the notification system 260. Further, functionality attributed to one component of the notification system 260 may be accomplished by a different component included in the notification system 260 or a different system than those illustrated. For example, the wireless interface 320 may be considered part of another system, such as the sensor suite 140, and utilized by the notification system 260. As another example, the vehicle identifier 310, or some features of the vehicle identifier 310, may be included in or shared by the object recognition engine 210. Furthermore, while the notification system 260 was shown in FIG. 2 as being part of the AV's onboard computer 150, in some embodiments, one or more components or features of the notification system 260 are implemented at the fleet management system 120 or one or more other servers located remotely from the AV 110.

The vehicle identifier 310 identifies one or more vehicles in the current environment of the AV 110. The vehicle identifier 310 may receive any of the sensor data described with respect to the object recognition engine 210. In some embodiments, based on the sensor data, the vehicle identifier 310 identifies one or more vehicle features, such as vehicle type (e.g., sedan, truck, van, etc.), color, make, model, etc. As another example, the vehicle identifier 310 may identify a license plate or other identifying signage on a vehicle, such as a commercial logo or a bumper sticker.

The vehicle identifier 310 may determine a location of a vehicle. The location may be defined using a latitude and longitude, street address (e.g., in front of 123 Main Street), in relation to a landmark (e.g., in front of a particular sign or building), in relation to a roadway (e.g., on the right-most lane, in a parking lane), in relation to the AV 110 (e.g., directly behind or in front of the AV 110, across an intersection from the AV 110, at a particular angle and distance front the AV 110, etc.), in relation to one or more other vehicles in the vicinity of the AV 110, or some other type of location definition or combination of location definitions.

In some embodiments, the vehicle identifier 310 identifies vehicles in the current environment of the AV 110 based on wireless signals transmitted by the vehicles, or devices operating within the vehicles. For example, the user device 170 in the vehicle 160 transmits identifying information for the user device 170 and/or vehicle 160, which is received at the wireless interface 320 and passed to the vehicle identifier 310. For example, the user device 170 may transmit its current location (e.g., a latitude and longitude), one or more vehicle features (e.g., vehicle type, color, make, model, etc.), license plate number, or other information that the AV 110 can use to identify the vehicle 160 in its surroundings. The user device 170 may transmit such information in response to a request for vehicle information broadcast by the AV 110 (e.g., by the wireless interface 320).

Based on the wireless signals received from the user devices, the vehicle identifier 310 may associate user devices with vehicles identified in the current environment of the AV 110, e.g., vehicles identified by the object recognition engine 210. For example, if the user device 170 reports its location as being at a particular latitude and longitude, and the object recognition engine 210 detects the vehicle 160 at approximately the same latitude and longitude (e.g., the detected latitude/longitude is within a threshold error tolerance of the reported latitude/longitude, and/or the detected latitude/longitude closer to the reported latitude/longitude than any other vehicle detected by the object recognition engine 210), the vehicle identifier 310 associates the user device 170 with the detected vehicle 160. As another example, if the user device 170 indicates that it is associated with a red pickup truck, and the object recognition engine 210 detects one red pickup truck in its current environment, the vehicle identifier 310 associates the user device 170 with the red pickup truck detected by the object recognition engine 210.

In some embodiments, the AV 110 and user device 170 perform a handshake that enables the AV 110 to identify the user device 170 based on their relative locations and/or relative distances. For example, if there are three vehicles in the current environment of the AV 110, the sensor suite 140 may calculate a distance to each vehicle (e.g., using lidar). The vehicle identifier 310 and user device 170 may perform a data handshake that allows the vehicle identifier 310 to determine a distance to the user device 170 using a time-of-flight (ToF) measurement. The vehicle identifier 310 compares the distance to each vehicle as determined by the sensor suite 140 to the ToF distance, and the vehicle identifier 310 associates the user device 170 with the vehicle having the nearest distance (as determined by the sensor suite 140) to the ToF distance. In some embodiments, the handshake may enable the vehicle identifier 310 to determine a direction of the user device 170 relative to the AV 110, which the vehicle identifier 310 compares to the directions of vehicles relative to the AV 110 as determined by the sensor suite 140.

The wireless interface 320 is configured to communicate with user devices in vehicles, such as the user device 170. The wireless interface 320 may use any short-range wireless protocol, such as Bluetooth, Wi-Fi or other wireless local area network (WLAN) protocols, vehicular communications protocols (e.g., wireless access for vehicular environments (WAVE), vehicle-to-vehicle (V2V), or other vehicular ad hoc networks (VANETs)), or other suitable wireless communication mechanisms. In some embodiments, the wireless interface 320 or another communications interface is configured to communicate over a wide area network, such as a cellular network or the Internet. For example, the wireless interface 320 receives a short-range wireless signal transmitted by the user device 170 that provides an identifier for the user device 170 on another network, such as the Internet.

The wireless interface 320, or another interface, can then use this identifier to communicate with the user device 170 via the other network.

In some embodiments, the wireless interface 320 is a transmitter (e.g., the wireless interface 320 transmits notifications but does not receive incoming signals from user devices 170). In some embodiments, the wireless interface 320 is a receiver (e.g., the wireless interface 320 receives network identifiers transmitted directly by user devices 170, and the AV 110 communicates with the user devices 170 over an alternate network). In still other embodiments, the wireless interface 320 is a transceiver that both transmits and receives wireless signals.

Figure 5:
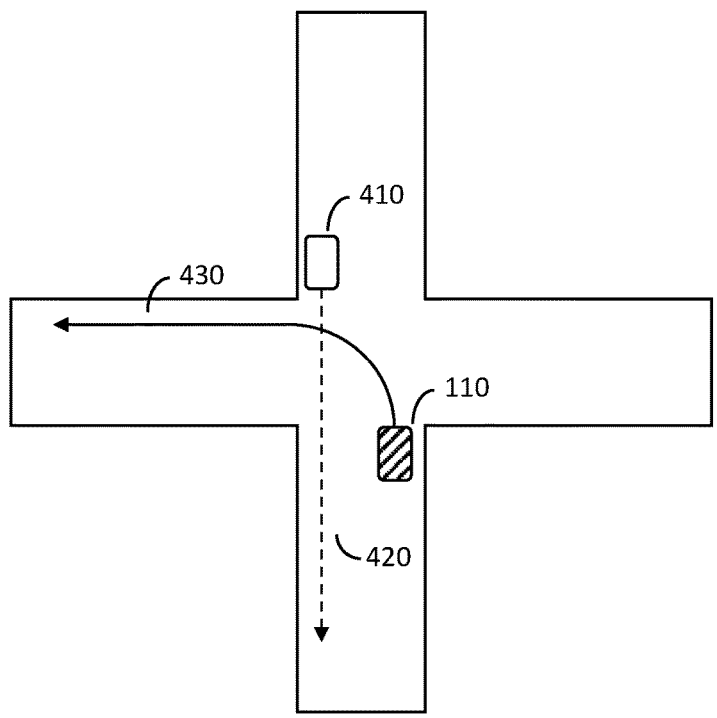
FIG. 5 illustrates a first example situation in which the AV provides a notification for a nearby driver according to some embodiments of the present disclosure.
Figure 6:
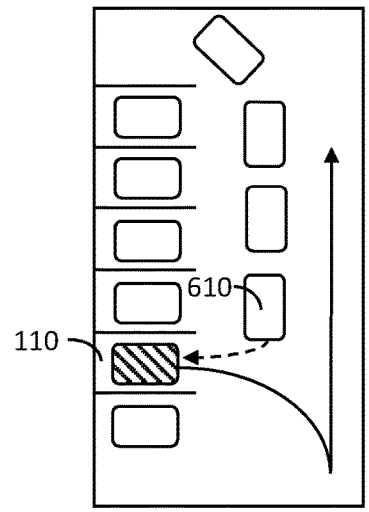
FIG. 6 illustrates a second example situation in which the AV provides a notification for a nearby driver according to some embodiments of the present disclosure.
Figure 8:
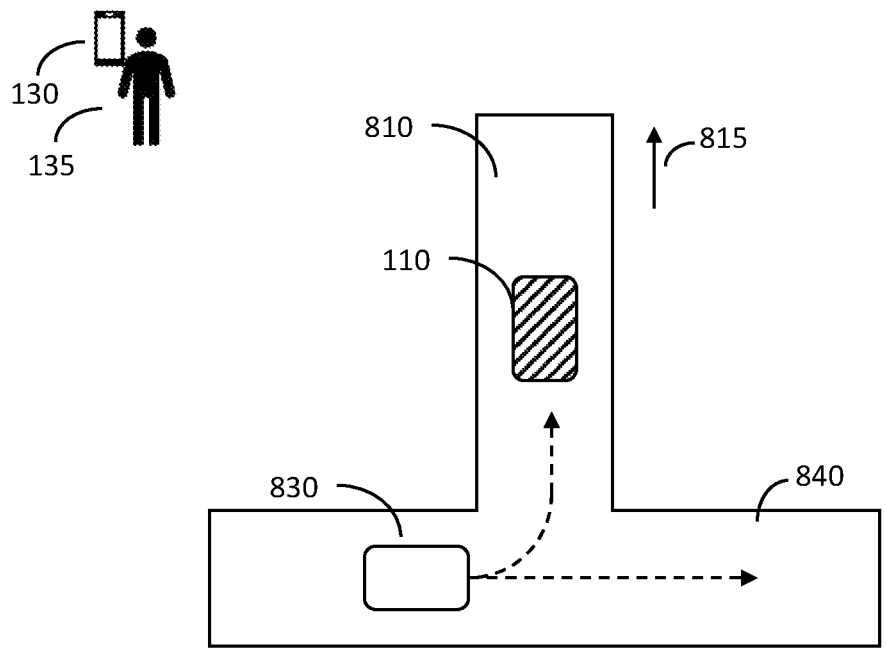
FIG. 8 illustrates an example situation in which the AV provides a notification with an estimated time that the AV is blocking another vehicle's path according to some embodiments of the present disclosure.

The notification decision logic 330 determines when to send a notification to a user device. In some embodiments, the notification system 260 uses a broadcasting approach, where the notification system 260 transmits its status and planned behavior information on a continually or on a regular basis (e.g., once per second, every tenth of a second, or at some other interval). In such embodiments, the user device 170 may perform some notification filtering, as described with respect to FIG. 9. In other embodiments, the notification decision logic 330 selects some subset of actions for notifying one or more vehicles in its environment. For example, the notification decision logic 330 receives data describing planned behaviors of the AV 110 from the path planning system 230. The notification decision logic 330 determines if any of the planned behaviors may impact vehicles in the current environment of the AV 110, e.g., if any of the planned behaviors blocks a predicted pathway of the vehicle 160 or crosses a predicted pathway of the vehicle 160. Several example planned behaviors that may impact other vehicles are illustrated in FIGS. 5, 6, and 8.

In some embodiments, the notification decision logic 330 determines whether to send a notification intended for a particular vehicle depending on whether the vehicle identifier 310 detects a user device associated with the vehicle. For example, if the vehicle identifier 310 identifies the user device 170 and associates the user device 170 with the vehicle 160, the notification decision logic 330 determines to transmit a notification intended for the driver 175 of the vehicle 160 to the user device 170. By contrast, if the vehicle identifier 310 does not detect a suitable user device in a vehicle for receiving a notification from the AV 110, the notification decision logic 330 determines not to transmit a notification intended for the driver of that vehicle.

In some embodiments, the notification decision logic 330 receives information from the AV service interface 240 to determine whether to send a notification. For example, if the AV 110 is picking up a passenger and will temporarily block the flow of traffic, and the AV service interface 240 determines that a passenger is a short distance (e.g., less than 20 seconds of walking time, less than 50 meters, or some other threshold) away from the AV 110, the notification decision logic 330 decides not to send a notification to user devices in one or more vehicles in the current environment of the AV 110. By contrast, if the AV service interface 240 determines that the passenger is a longer distance (e.g., more than 20 seconds of walking time, more than 50 meters, etc.) away from the AV 110, the notification decision logic 330 decides to send a notification to user devices in one or more vehicles in the current environment of the AV 110.

As noted above, the AV 110 includes various external lights that are also used to signal planned behaviors. The notification decision logic 330 may select among various notification options, including wireless notifications and external lights. The notification decision logic 330 may determined whether a planned behavior, such as a right or left turn or a lane change, can be conveyed using external lights or other on-board signaling mechanisms, such as a horn. In one example, the notification decision logic 330, optionally based on data from the object prediction engine 220 and/or sensor suite 140, may determine whether a stopping location of the AV 110 (e.g., a location for loading or unloading passengers or delivery items) permits other vehicles to pass by the AV 110, or if the AV 110 blocks the flow of traffic. If the AV 110 is stopping in a legal parking spot, the notification decision logic 330 may decide not to provide any notification. If the AV 110 is stopping along a wide or low-traffic street (e.g., in one lane of a road with multiple lanes traveling in the same direction), the notification decision logic 330 may decide to use the hazard lights to signal that the AV 110 is stopped and other vehicles should go around the AV 110. If the AV 110 is stopping for passenger loading or unloading on a high-traffic and/or narrow street (e.g., the AV 110 is blocking or may block all traffic in one direction), the notification decision logic 330 may determine to transmit a wireless notification to one or more vehicles in the environment of the AV 110. In this situation, the notification decision logic 330 determine to use the hazard lights as well, in addition to the wireless notification.

The notification generator 340 generates a notification to transmit to one or more user devices in other vehicles, e.g., the user device 170. The notification generator 340 may generate a notification in response to a decision from the notification decision logic 330, as described above. The notification generator 340 may include various information in the notification, including data describing the planned behavior of the AV 110 (e.g., waiting for a user interaction (e.g., loading or unloading a passenger or delivery item), waiting for another vehicle to proceed, or entering or exiting a parking space), data describing timing information (e.g., an estimated time that the AV 110 expects to be stopped at a particular location), data identifying the AV 110 (e.g., a current location of the AV 110, a physical description of the AV 110, the license plate number or other identifier of the AV 110, etc.), and data identifying one or more vehicles targeted for the message (e.g., any of the data identified by the vehicle identifier 310.) In some embodiments, the notification generator 340 includes an audio file, image file, or video file for the user device 170 to play or display, e.g., an audio message that says, "Please go ahead!" Alternately, an audio file, image file, or video file may be stored on or accessible to the user device 170 (e.g., via the Internet), and the notification generator 340 includes a pointer to the particular file to be retrieved by the user device 170. The notification generator 340 passes the notification to the wireless interface 320, which transmits the notification to one or more user devices, e.g., the user device 170.

The path planning feedback module 350 provides data to the path planning system 230 indicating whether or not a notification has been successfully sent to the user device of another vehicle. For example, after the wireless interface 320 transmits a notification to the user device 170, the user device 170 may transmit a confirmation message to the wireless interface 320, which receives the confirmation message and passes it to the path planning feedback module 350. The confirmation message may indicate that the user device 170 output the notification to the driver 175. If the path planning feedback module 350 alerts the path planning system 230 that the notification was successfully received by the user device 170, the path planning system 230 and vehicle control system 250 may proceed with the previously determined plan. Alternatively, if the path planning feedback module 350 does not receive a confirmation that the notification has been successfully delivered, the path planning system 230 may determine a different planned behavior for the AV 110. For example, the path planning system 230 may select a different location to stop the AV 110, or circle the block before stopping the AV 110, if nearby vehicles cannot be adequately warned that the AV 110 plans to block traffic for a period of time.

Figure 4:
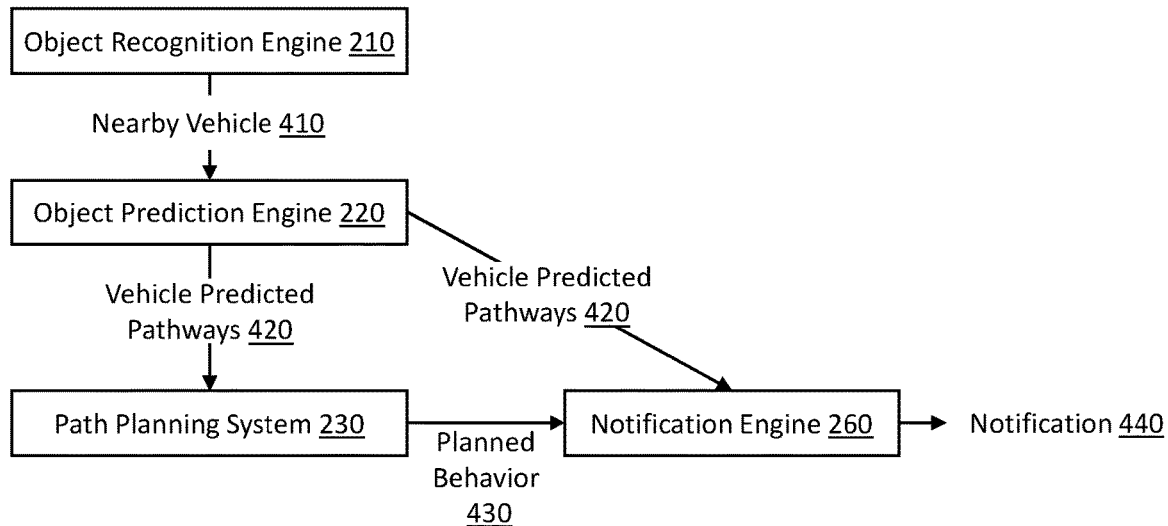
FIG. 4 is a flow diagram showing a process for generating a notification from the AV to a nearby driver according to some embodiments of the present disclosure.

Example Process and Illustrations of Generating Notifications about Planned Behavior FIG. 4 is a flow diagram showing a process for generating a notification from the AV to a nearby driver according to some embodiments of the present disclosure. The object recognition engine 210 identifies a nearby vehicle 410 in the environment of the AV 110. The object recognition engine 210 may more generally identify objects that are in motion or have the potential to be in motion, such as vehicles, pedestrians, bicyclists, scooters, animals, etc. In some embodiments, the object recognition engine 210 distinguishes between vehicles that are driving and/or turned on (e.g., based on their roadway location, whether their running lights or other lights are on) and vehicles that are parked.

FIG. 5 illustrates an example situation in which the AV 110 identifies a nearby vehicle and provides a notification for a nearby driver. In FIG. 5, the object recognition engine 210 of the AV 110 identifies the nearby vehicle 410. In this example, the AV 110 and nearby vehicle 410 are approaching an intersection from opposite directions.

Returning to FIG. 4, for each of the nearby vehicles 410 identified by the object recognition engine 210, the object prediction engine 220 determines one or more vehicle predicted pathways 420. For example, the vehicle predicted pathways 420 may include predicted location data, predicted velocity data, and statistical likelihoods of various predicted pathways. An example predicted pathway 420 of the nearby vehicle 410 is shown in FIG. 5 with a dashed line. In this example, the object prediction engine 220 may observe that the nearby vehicle 410 is at the intersection and does not have a turn signal turned on. Based on this information, the object prediction engine 220 predicts that the nearby vehicle 410 intends to proceed straight through the intersection. The object prediction engine 220 may predict other possible pathways, e.g., pathways for the nearby vehicle 410 to turn left, turn right, or make a U-turn.

The path planning system 230 receives the vehicle predicted pathways 420 and generates planned behavior 430 for the AV 110 based on, among other things, the predicted pathways 420 of the nearby vehicles 410. In the example shown in FIG. 5, the AV 110 has a planned pathway 430 which crosses the predicted pathway 420 of the nearby vehicle 410. The path planning system 230 may determine that right-of-way in this interaction is ambiguous, for example, the AV 110 and the nearby vehicle 410 reached the intersection at the same time or nearly the same time. In this example, the path planning system 230 may determine a planned behavior 430 for the AV 110 that includes waiting for the other vehicle 410 to proceed through the intersection, giving the nearby vehicle 410 the right-of-way.

Returning to FIG. 4, the notification system 260 receives the vehicle predicted pathways 420 from the object prediction engine 220 and the planned behavior 430 from the path planning system 230. The notification system 260 determines to generate a notification 440, and the AV 110 transmits the notification 440 to user devices in one or more nearby vehicles 410. The notification system 260 may generate the notification 440 as described with respect to FIG. 3. In the example shown in FIG. 5, the notification system 260 (e.g., the decision notification logic 330) determines that the planned behavior 430 of the AV 110 crosses the predicted pathway 420 of the nearby vehicle 410, and that the AV 110 intends to wait for the nearby vehicle 410 to proceed through the intersection. The notification system 260 (e.g., the notification generator 340) generates a notification 440 indicating that the AV 110 is offering the right-of-way to the nearby vehicle 410, and the wireless interface 320 transmits the notification 440 to a user device in the nearby vehicle 410 (e.g., the user device 170).

FIG. 6 illustrates a second example situation in which the AV provides a notification for a nearby driver according to some embodiments of the present disclosure. In this example, the AV 110 is parked in a parking space in a row of full parking spaces. A stream of nearby vehicles led by the vehicle 610 is traveling around the parking lot, searching for parking spaces. A planned pathway of the AV 110 is shown with a solid line that indicates that the AV 110 intends to back out of the parking space and proceed in the direction of travel opposite the vehicle 610. One predicted pathway of the vehicle 610 is shown with a dashed line, indicating that the vehicle 610 may want to pull into the parking space vacated by the AV 110 (if the AV 110 vacates the parking space). In this example, the notification system 260 generates a notification from the AV 110 to a user device in the vehicle 610 indicating that the AV 110 would like to vacate the parking space. Upon receiving the notification, the driver of the vehicle 610 may stop and allow the AV 110 to pull out along its projected pathway, so that the vehicle 610 can take the parking space.

As another example, if the AV 110 is waiting for a user interaction (e.g., for a delivery item to be loaded into the AV 110, or an AV passenger to enter or exit the AV 110), the AV 110 may provide a notification to a user device in the vehicle 610 indicating how soon the AV 110 intends to vacate the parking space. The driver of the vehicle 610 can then decide whether to wait for the AV 110 to vacate the parking space, or to continue searching for parking elsewhere. If the AV 110 is idling and waiting for an indeterminate amount of time (e.g., waiting for a delivery item to be loaded into the AV 110, but the AV 110 or fleet management system 120 do not have information indicating a projected time for the item to be loaded), the AV 110 may transmit a notification to a user device in the vehicle 610 indicating that the AV 110 is idling and the vehicle 610 should proceed to another parking space, rather than waiting for the AV 110 to vacate its parking space.

Example Process and Illustration of Generating Blocking Time Notification

As noted above, the AV 110 may provide a notification to nearby vehicles when the AV 110 is stopping for a user interaction, and the AV 110 expects to stop or idle for a period of time before and/or during the user interaction. In some situations, during a user interaction, it may be difficult or impossible for the AV 110 to avoid temporarily blocking or reducing the flow of traffic. For example, if the AV 110 is transporting a disabled or elderly passenger, it may not be feasible for the passenger to walk between their origin location or destination location (e.g., their home) to an area where the AV 110 does not block the flow of traffic, so the AV 110 temporarily idles to enable the user interaction (e.g., to drop off the passenger in front of their home). However, the AV 110 blocking the flow of traffic for any reason can be frustrating for other drivers. To better inform other drivers and enable them to reroute, the notification system 260 provides notifications to nearby drivers.

Figure 7:
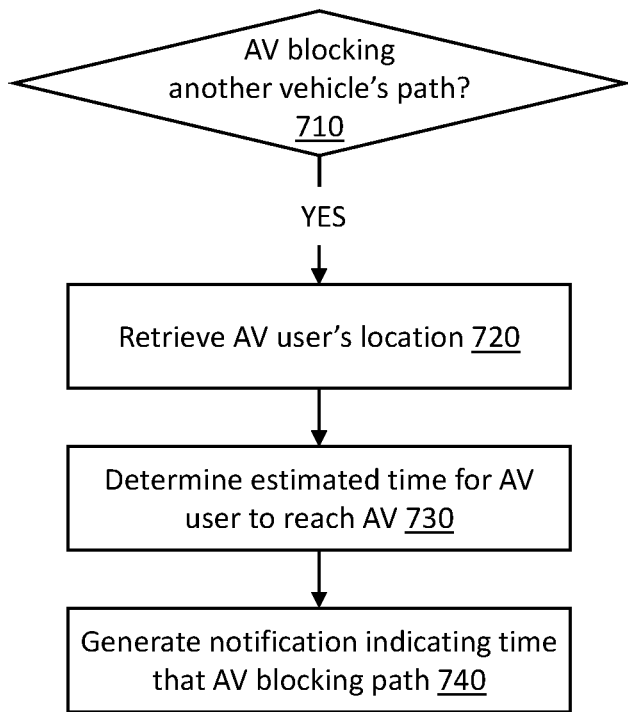
FIG. 7 is a flow diagram showing a process for providing an estimated time that an AV may block another vehicle's path according to some embodiments of the present disclosure.

FIG. 7 is a flow diagram showing an example process for providing an estimated time that an AV may block another vehicle's path according to some embodiments of the present disclosure. The notification system 260 determines 710 whether the AV 110 is blocking, or may block, another vehicle's path. For example, the notification decision logic 330 receives information about the planned pathway (e.g., the idling location) from the path planning system 230. The notification decision logic 330 may also receive data describing other vehicles around the AV 110 from the object recognition engine 210 and/or object prediction engine 220. The notification decision logic 330 may also receive information about the roadway the AV 110 is on, such as the number of lanes in each direction and the width of each lane, which indicates whether other vehicles are able to drive around the AV 110 while it idles.

An example situation in which the AV 110 may block traffic is shown in FIG. 8. In this example, the AV 110 stops partway down a one-way, one-lane road 810 with a direction of traffic flow indicated by the arrow 815. Based on the stopping location of the AV 110 and the characteristics of the road 810, the notification decision logic 330 determines that the AV 110 may block another vehicle's path. As shown in FIG. 8, a nearby vehicle 830 is traveling along a road 840 that intersects the road 810. The nearby vehicle 820 is traveling towards the right in the orientation of FIG. 8. Two potential pathways are shown for the nearby vehicle 830 in dashed lines; these potential pathways may be determined by the object prediction engine 220. The notification decision logic 330 may receive information about the nearby vehicle 830 and determine that the AV 110 may block a pathway or potential pathway of the nearby vehicle 830. Alternatively, the notification decision logic 330 may determine that, based on the stopping location of the AV 110, the AV 110 could potentially block another vehicle's path.

In response to determining that the AV 110 is blocking or may block another vehicle's path, the notification system 260 retrieves 720 the location of an AV user, e.g., a user who requested a ride from the AV 110, or a user who is accepting a delivery from the AV 110. The user may make their real-time location available to the fleet management system 120 and/or the AV 110 during a time period leading up to the user interaction. Knowing the user's real-time location can assist the AV 110 in finding the user, and vice versa. The location may be determined and transmitted by a user device associated with the user. For example, in FIG. 8, the AV user 135 may be a passenger of a ride service provided by the AV 110. The AV user 135 is walking towards the AV 110 from another location while carrying the user device 130. The notification system 260 retrieves the location of the user 135 from the user device 130, either directly or from the fleet management system 120.

The notification system 260 determines 730 an estimated time for the AV user to reach the AV 110. For example, if the user 135 is walking from another location to the AV 110, the notification system 260 determines an estimated time for the user 135 to walk from the user's current location to the AV location. The notification system 260 may determine a method of travel of the user (e.g., foot, bike, scooter, etc.) based on the speed of the user or other factors and determine the estimated time based on the method of travel, or based on the speed of the user. The notification system 260 may also determine a likely route traveled by the user to estimate the time for the AV user 135 to reach the AV 110.

The notification system 260 then generates 740 a notification indicating the amount of time that the AV 110 expects to block the flow of traffic. The amount of time is based on the estimated time for the AV user 135 to reach the AV 110. In some embodiments the notification system 260 may add a buffer time, e.g., one or two minutes, to account for the time it takes for a passenger to get settled into the AV 110, the time it takes a for a delivery user to retrieve a delivery item, or other factors. The notification system 260 may select a buffer time based on one or more characteristics of the user, e.g., how long it has historically taken the user to find and get into the AV, whether the user is traveling with additional passengers, whether the pickup or destination location suggests that the user is traveling with luggage (e.g., the user is traveling to or from a train station or airport), the amount of items a delivery user is retrieving (e.g., one bag of food or 10 bags of groceries), etc. In some embodiments, the notification indicates that the AV 110 is waiting for an AV user, e.g., the notification explains that the AV 110 is waiting for a passenger to exit or enter the vehicle, or that the AV 110 is waiting for a user to accept a delivery from the AV 110.

In the example shown in FIG. 8, if a user device in the nearby vehicle 830 receives the notification from the AV 110, the driver of the nearby vehicle 830 can opt to continue straight down the road 840, rather than turning down the road 810. If the driver had intended to turn down the road 810, the time estimate may be particularly useful; for example, if the notification indicates that the AV 110 expects to block the flow of traffic for a short amount of time (e.g., one minute), the driver may opt to turn down the road 810. On the other hand, if the notification indicates that the AV 110 expects to block the flow of traffic for a longer period of time (e.g., three minutes), the driver may opt to take a different route. If the AV 110 had no notification, or only turned on its hazard lights, the driver would have to gamble on how long the AV 110 may be stopped, and may become stuck behind the AV 110 for an extended period of time.

Example User Device for Outputting AV Notifications

Figure 9:
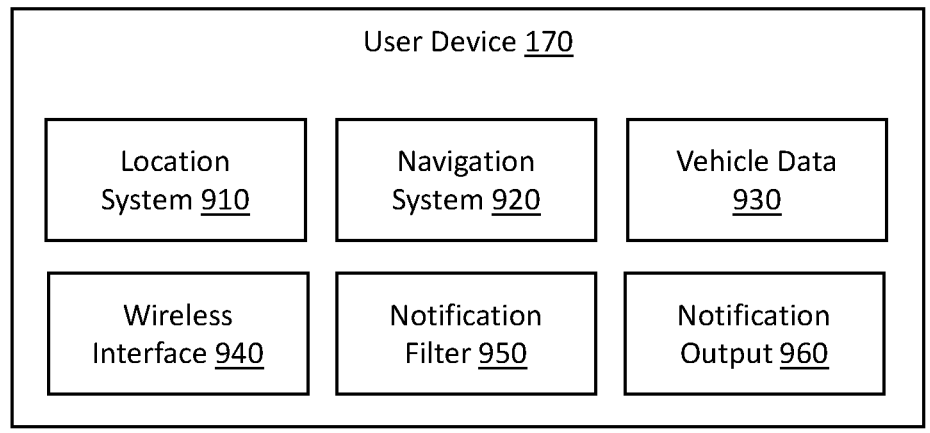
FIG. 9 is a block diagram illustrating a user device for providing AV notifications according to some embodiments of the present disclosure.

FIG. 9 is a block diagram illustrating the user device 170 for providing AV notifications according to some embodiments of the present disclosure. The user device 170 includes a location system 910, a navigation system 920, vehicle data 930, a wireless interface 940, a notification filter 950, and a notification output 960. In alternative configurations, fewer, different and/or additional components may be included in the user device 170. Further, functionality attributed to one component of the user device 170 may be accomplished by a different component included in the user device 170 or a different system than those illustrated.

In some embodiments, one or more components of the user device 170 are implemented by an application or a set of applications running on the user device 170. For example, the user device 170 executes an application that provides turn-by-turn directions and outputs notifications from AVs. This application may include the navigation system 920, vehicle data 930, and notification filter 950, and the application may cooperate with the location system 910, wireless interface 940, and notification output 960. As another example, the user device 170 executes an application that provides information about AVs. This application may include the vehicle data 930 and notification filter 950, and in some embodiments, this application receives information (e.g., a projected route) from a separate turn-by-turn navigation application. Certain operations or functionality may be provided by one or more servers in communication with the user device 170; for example, an application server may provide routing services accessed by the navigation system 920.

The location system 910 determines a current location of the user device 170. The location system 910 may include various location sensors, such as a GPS sensor, one or more inertial measurement units (IMUS), Wi-Fi sensors, Bluetooth sensors, and/or other sensors that may be used to determine a location of the user device 170. The location system 910 may further include a processing unit (e.g., the main processor of the user device 170 or a separate processing unit) that receives signals from the location sensors and determines the current location of the user device 170.

The navigation system 920 determines an optimal route to travel between two or more locations, and instructs a user of the user device 170 to follow the determined route. The navigation system 920 may receive a current location from the location system 910 and update the route, and provide routing instructions, based on the current location.

The vehicle data 930 includes data stored on the user device 170 describing the vehicle 160 associated with the user device 170, or other data that can be used by the AV 110 to associate the user device 170 with the vehicle 160. The vehicle data 930 may include any of the vehicle features, vehicle identifiers, or other data described with respect to the vehicle identifier 310. Some or all of the vehicle data 930 may be provided by a user of the user device 170 and stored on the user device 170.

The wireless interface 940 is configured to communicate with the AV 110, and in particular, with the wireless interface 320 of the AV 110. The wireless interface 940 may use any of the wireless protocols described with respect to the wireless interface 320, including short-range direct wireless communications and/or communications over a wide-area network such as the Internet. The wireless interface 940 may provide location data (determined by the location system 910) and/or vehicle data 930 to the AV 110, as described with respect to FIG. 3. In addition, the wireless interface 940 is configured to receive notifications from the notification system 260 of the AV 110.

The notification filter 950 filters notifications received from AVs, such as from the notification system 260, and determines whether to output each notification to a user (e.g., to the driver 175). The notification filter 950 may implement various rules to determine whether to output a notification. For example, the notification filter 950 may filter different types of behaviors. As one example, the AV 110 broadcasts many of all of its planned behaviors, including when the AV 110 intends to drive straight down a road, change lanes, turn left or right, stop at a traffic light, etc. Some of the broadcast behaviors may not be interesting to the driver 175, or can be inferred by the driver 175 from observing the AV 110 itself. To avoid overwhelming the driver, the notification filter 950 may filter out some types of AV planned behaviors, e.g., so that the user device 170 outputs notifications for planned behaviors that cannot be observed from the AV 110 directly. In some embodiments, the user device 170 (e.g., an application running on the user device 170) may allow a user to specify which types of AV planned behaviors the driver 175 would like to receive. In some embodiments, the notification filter 950 may provide different types of alerts for different types of behaviors. For example, the notification filter 950 may include visual representations of each planned behavior of the AV 110 (e.g., with an on-screen arrow), but provide a higher-level alert, such as an audio notification, for a subset of planned behaviors.

As another example, the notification filter 950 compares a planned behavior of the AV 110 to a projected path of the vehicle 160. The notification filter 950 may access a projected path of the vehicle 160 from the navigation system 920, e.g., if the navigation system 920 is providing turn-by-turn routing instructions to the driver 175. The notification filter 950 compares the planned behavior of the AV 110 to the projected path from the navigation system 920 and determines whether the planned behavior of the AV 110 impacts the projected path of the vehicle 160, e.g., if the planned behavior of the AV 110 crosses the projected path of the vehicle 160. If the planned behavior of the AV 110 may impact the projected path of the vehicle 160, the notification filter 950 determines to output the planned behavior of the AV 110 to the driver 175.

As yet another example, the notification filter 950 compares an intended recipient of a notification to the vehicle data 930 to determine whether to output a notification. As described with respect to FIG. 3, the vehicle identifier 310 may identify vehicles (e.g., the vehicle 160) in the current environment of the AV 110. The notification may include data describing an intended recipient of the notification. The notification filter 950 compares this data to the vehicle data 930 to determine whether the vehicle 160 is the intended recipient, and if so, the notification filter 950 outputs the notification to the driver 175. In some embodiments, if the notification filter 950 determines that the vehicle data 930 matches the intended recipient of the notification, the user device 170 transmits, via the wireless interface 940, a confirmation message to the AV 110 indicating that the notification was received and output to its intended recipient.

The notification output 960 interfaces with one or more output devices for outputting a notification to the driver 175. The notification output 960 may include a display screen of the user device 170, a speaker of the user device 170, a display screen in the vehicle 160, a speaker system of the vehicle 160, or another output device or combination of output devices available to the driver 175. If the notification output 960 includes a speaker, the notification may be an audio message, e.g., an audio file sent from the AV 110 to the user device 170. Alternatively, the notification output 960 may generate an audio signal based on a text-based message received from the AV 110. If the notification output 960 includes a display screen, an application running on the user device 170 may generate a user interface that includes the notification, or data provided in the notification.

As noted with respect to FIG. 3, the notification may include data for identifying the AV 110, such as a location of the AV 110. The location of the AV 110 provided in the notification may be defined using a latitude and longitude, street address (e.g., in front of 123 Main Street), in relation to a landmark (e.g., in front of a particular sign or building), in relation to a roadway (e.g., on the right-most lane, in a parking lane), in relation to the vehicle 160 (e.g., directly behind or in front of the vehicle 160, across an intersection from the vehicle 160, at a particular angle and distance front the vehicle 160, etc.), or some other type of location definition or combination of location definitions. The notification output 960 may use the location information to identify a source of the notification on a visual display. For example, the user device 170 may display a user interface with a real-time image of its surroundings or a computer-generated animation (e.g., a map) of its surroundings. An application executing on the user device 170 can use the location of the AV 110 provided in the notification to place an on-screen notification on the user interface at the location or approximate location of the AV 110.

Figure 10:
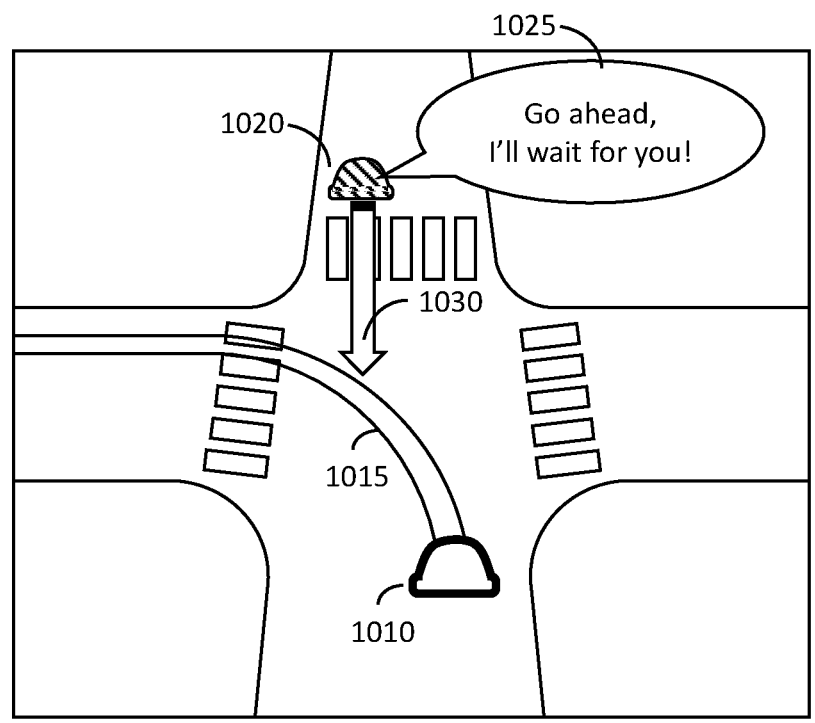
FIG. 10 is an example user interface illustrating a notification from an AV according to some embodiments of the present disclosure.

FIG. 10 is an example user interface illustrating a notification from an AV 110 according to some embodiments of the present disclosure. The user interface may be generated by a navigation application executing on the user device 170. The user interface is displayed by the user device 170 and/or a connected display (e.g., an in-vehicle display of the vehicle 160). The user interface includes an illustration of an intersection (e.g., the intersection shown in FIG. 5), an illustration 1010 of the vehicle 160, and a route 1015 planned by the navigation system 920 for the vehicle 160. The user interface further includes an illustration 1020 of the AV 110 that has transmitted a notification to the user device 170. The notification output 960 outputs a speech bubble 1025 with a message from the AV 110. The notification output 960 further outputs an arrow 1030 indicating the planned pathway of the AV 110. The notification from the AV 110 may include the message, the planned pathway, the location of the AV 110, the location of the vehicle 160 or other identifying information for the vehicle 160, or any other information described above.

In this example, the AV 110 provides the right-of-way to the vehicle 160, which plans to turn left in front of the AV 110. If, rather than turning left, the navigation system 920 instructs the driver 175 to turn right or to go straight, the notification filter 950 may determine not to output the notification in the speech bubble 1025, because the planned pathway of the AV 110 does not cross the route of the vehicle 160.

SELECT EXAMPLES

Example 1 provides a method for providing autonomous vehicle (AV) status information to another vehicle, the method including identifying a vehicle in a current environment of the AV; determining a predicted pathway for the identified vehicle; determining a planned behavior of an AV within the current environment of the AV, the planned behavior effecting the predicted pathway of the identified vehicle; generating a notification for the identified vehicle, the notification including data describing the planned behavior of the AV; and transmitting, by a wireless communication interface, the notification to a device in the identified vehicle.

Example 2 provides the method of example 1, where the planned behavior includes waiting at a location for a user of the AV to access the AV, and the notification indicates that the AV intends to wait at the location for the user of the AV.

Example 3 provides the method of example 2, where the user of the AV is a user of a ride service provided by the AV, and the location is a pickup location requested by the user.

Example 4 provides the method of example 2, where the user of the AV is a user of a delivery service provided by the AV, and the location is a delivery destination location requested by the user.

Example 5 provides the method of example 2, the method further including receiving data indicating a current location of the user, and determining an estimated time for the user to reach the location for the user to access the AV based on the current location, where the notification includes the estimated time.

Example 6 provides the method of example 1, further including determining that the planned behavior cannot be conveyed using one or more external lights of the AV and, in response, determining to generate the notification for the identified vehicle.

Example 7 provides the method of example 1, where the AV is located in a parking spot, and the planned behavior includes one of vacating the parking spot and remaining in the parking spot.

Example 8 provides the method of example 1, where the AV is located in a roadway and the predicted pathway of the identified vehicle cross a planned pathway of the AV, and the planned behavior is waiting for the identified vehicle to cross the planned pathway of the AV.

Example 9 provides the method of example 1, further including receiving, from the device in the identified vehicle, a confirmation that the device received the notification; and proceeding with the planned behavior in response to the confirmation.

Example 10 provides the method of example 1, where the identified vehicle is one of a plurality of vehicles in a current environment of the AV, the method further including receiving, from the device in the identified vehicle, data identifying the device; associating the device with the identified vehicle; and generating the notification for the identified vehicle based on the received data identifying the device.

Example 11 provides a method for providing status information of an AV including receiving, at a device in a non-autonomous vehicle from an AV, a notification describing a planned behavior of the AV, the notification including a location of the AV, and the notification transmitted to at least one device in a current environment of the AV via a wireless communication interface; determining, based on data in the notification and at least one rule for outputting planned behaviors, whether to output the planned behavior to a user of the device; and in response to determining to output the planned behavior, outputting a notification to the user of the device describing the planned behavior of the AV.

Example 12 provides the method of example 11, where determining whether to output the planned behavior includes accessing a projected path of the non-autonomous vehicle, comparing the projected path of the non-autonomous vehicle to at least one of the location of the AV and a planned path of the AV, and determining to output the planned behavior in response to the projected path crossing the location of the AV or the planned path of the AV.

Example 13 provides the method of example 11, where the notification includes data describing an intended recipient of the notification, and determining whether to output the planned behavior includes comparing the data describing the intended recipient of the notification to data describing at least one of the device and the non-autonomous vehicle.

Example 14 provides the method of example 11, where the at least one rule for outputting planned behaviors includes a set of planned behaviors to output to the user, and a set of planned behaviors to not output to a user.

Example 15 provides the method of example 11, where outputting a notification includes generating a display output by the device, the display including an image of the AV and information describing the planned behavior of the AV.

Example 16 provides the method of example 11, where the notification includes an audio message for the user of the device, and outputting the notification includes playing the audio message.

Example 17 provides a system for providing AV notifications, the system including a path planning system to determine a planned behavior of the AV; an object prediction engine to generate a predicted pathway of a vehicle in a current environment of the AV, the planned behavior of the AV effecting the predicted pathway of the vehicle; a notification system configured to generate a notification for the vehicle, the notification including data describing the planned behavior of the AV; and a wireless communication interface to transmit the notification to a device in the vehicle.

Example 18 provides the system of example 17, further including a vehicle identification system configured to identify the vehicle in the environment of the AV based on at least one of an image captured by an AV camera and data received from the device in the vehicle by the wireless communication interface.

Example 19 provides the system of example 17, where the planned behavior includes waiting at a location for a user of the AV to access the AV, and the notification indicates that the AV intends to wait at the location for the user of the AV.

Example 20 provides the system of example 17, further including a path planning feedback module to determine if the notification was delivered to the device in the vehicle; and in response to determining that the notification was not delivered to the device in the vehicle, transmitting an alert to the path planning system; where the path planning system is configured to determine a second planned behavior in response to the alert.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for providing autonomous vehicle (AV) status information to another vehicle, the method comprising:
   identifying a vehicle in a current environment of the AV;
   determining a predicted pathway for the identified vehicle;
   determining a planned behavior of the AV, the planned behavior effecting the predicted pathway of the identified vehicle, the planned behavior comprising waiting at a location for a user of the AV to access the AV;
   generating a notification for the identified vehicle, the notification comprising data describing the planned behavior of the AV, the notification indicating that the AV intends to wait at the location for the user of the AV; and
   transmitting, by a wireless communication interface, the notification to a device in the identified vehicle.

2. The method of claim 1, wherein the user of the AV is a user of a ride service provided by the AV, and the location is a pickup location requested by the user.

3. The method of claim 1, wherein the user of the AV is a user of a delivery service provided by the AV, and the location is a delivery destination location requested by the user.

4. The method of claim 1, the method further comprising:
receiving data indicating a current location of the user; and
determining an estimated time for the user to reach the location for the user to access the AV based on the current location;
wherein the notification comprises the estimated time.

5. The method of claim 1, further comprising determining that the planned behavior cannot be conveyed using one or more external lights of the AV and, in response, determining to generate the notification for the identified vehicle.

6. The method of claim 1, wherein the AV is located in a parking spot, and the planned behavior includes one of vacating the parking spot and remaining in the parking spot.

7. The method of claim 1, further comprising:
receiving, from the device in the identified vehicle, a confirmation that the device received the notification; and
proceeding with the planned behavior in response to the confirmation.

8. The method of claim 1, wherein the identified vehicle is one of a plurality of vehicles in a current environment of the AV, the method further comprising:
receiving, from the device in the identified vehicle, data identifying the device;
associating the device with the identified vehicle; and
generating the notification for the identified vehicle based on the received data identifying the device.

9. A method for providing status information of an autonomous vehicle (AV) comprising:
receiving, at a device in a non-autonomous vehicle from an AV, information describing a planned behavior of the AV, the information comprising a location of the AV, and the information transmitted to at least one device in a current environment of the AV via a wireless communication interface;
determining, based on the information and at least one rule for outputting planned behaviors, whether to output the planned behavior to a user of the device receiving the information, the at least one rule for outputting planned behaviors comprising a set of planned behaviors to output and a set of planned behaviors to not output; and
in response to determining to output the planned behavior, outputting a notification to the user of the device receiving the information, the notification describing the planned behavior of the AV.

10. The method of claim 9, wherein determining whether to output the planned behavior comprises:
accessing a projected path of the non-autonomous vehicle;
comparing the projected path of the non-autonomous vehicle to at least one of the location of the AV and a planned path of the AV; and
determining to output the planned behavior in response to the projected path crossing the location of the AV or the planned path of the AV.

11. The method of claim 9, wherein the information comprises data describing an intended recipient of the information, and determining whether to output the planned behavior comprises:

comparing the data describing the intended recipient of the information to data describing at least one of the device and the non-autonomous vehicle.

12. The method of claim 9, wherein outputting the notification comprises generating a display output by the device, the display comprising an image of the AV and information describing the planned behavior of the AV.

13. The method of claim 9, wherein the information comprises an audio message for the user of the device, and outputting the notification comprises playing the audio message.

14. The method of claim 9, wherein the planned behavior comprises waiting at a location for a user of the AV to access the AV, and the notification indicates that the AV intends to wait at the location for the user of the AV.

15. A system for providing autonomous vehicle (AV) notifications comprising:
a path planning system to determine a planned behavior of the AV;
an object prediction engine to generate a predicted pathway of a vehicle in a current environment of the AV, the planned behavior of the AV effecting the predicted pathway of the vehicle;
a notification system configured to generate a notification for the vehicle, the notification comprising data describing the planned behavior of the AV, the planned behavior comprising waiting at a location for a user of the AV to access the AV, and the notification indicating that the AV intends to wait at the location for the user of the AV; and
a wireless communication interface to transmit the notification to a device in the vehicle.

16. The system of claim 15, further comprising a vehicle identification system configured to identify the vehicle in the environment of the AV based on at least one of an image captured by an AV camera and data received from the device in the vehicle by the wireless communication interface.

17. The system of claim 15, further comprising a path planning feedback module to:
determine if the notification was delivered to the device in the vehicle; and
in response to determining that the notification was not delivered to the device in the vehicle, transmitting an alert to the path planning system;
wherein the path planning system is configured to determine a second planned behavior in response to the alert.

18. The system of claim 15, wherein the user of the AV is a user of a ride service provided by the AV, and the location is a pickup location requested by the user.

19. The system of claim 15, wherein the user of the AV is a user of a delivery service provided by the AV, and the location is a delivery destination location requested by the user.

20. The system of claim 15, the notification system further configured to:
receive data indicating a current location of the user; and
determine an estimated time for the user to reach the location for the user to access the AV based on the current location;
wherein the notification comprises the estimated time.

* * * * *